United States Patent Office 3,160,495
Patented Dec. 8, 1964

3,160,495
WET PROCESS PHOSPHORIC ACID AND LIQUID FERTILIZER COMPOSITIONS CONTAINING THE SAME
Homer A. Smith, Berkeley Heights, and Edgar W. Sawyer, Jr., Metuchen, N.J., assignors to Minerals & Chemicals Philipp Corporation, Menlo Park, N.J., a corporation of Maryland
No Drawing. Filed Mar. 28, 1961, Ser. No. 98,747
4 Claims. (Cl. 71—52)

This invention relates generally to improvements in wet process phosphoric acid containing impurities normally incident to its production and relates, especially to liquid fertilizer compositions formulated with such acid. This application is a continuation-in-part of our copending U.S. Patent application, Serial No. 668,883, filed July 1, 1957, and now abandoned.

Wet process phosphoric acid is obtained by leaching phosphate rock with sulfuric acid. The phosphate rock, an impure ore consisting predominantly of calcium phosphate, is reacted with the acid and the reaction mass diluted with water to permit a sludge consisting for the most part of calcium sulfates to settle out. The supernatant liquid, consisting predominantly of an impure phosphoric acid solution, is separated from the sludge, filtered and then condensed when a concentrated grade of crude wet process acid, such as the approximately 54% $P_2O_5$ commercial grade, is desired. Various modifications of this general process are described in Kirk Othmer's "Encyclopedia of Chemical Technology," vol. 6, page 412.

The freshly prepared mother liquid, obtained by the process briefly described above, is sometimes called "green acid" because of its color, and it contains many impurities incident to its production. These impurities, which are apparently soluble in the freshly produced acid, include aluminum, iron and calcium salts as well as smaller amounts of magnesium salts and trace quantities of a wide variety of metallic compounds. Also present is sulfate ion.

Frequently, the green acid is aged for about 10 days before shipment. During aging, some of the impurities flocculate and settle out, typically in an amount within the range of about 10% to 15% by weight of the acid. Some of these impurities settle out as insoluble phosphates and thereby lower the available $P_2O_5$ content of the supernatant liquid. Unless the insolubles are recycled in the leaching step, which is rarely practical, a loss of valuable material is experienced. The aged green acid still contains metallic impurities incident to its production. Some of these impurities are soluble in the acid while others are suspended therein.

An analysis of an impure concentrated wet process acid from Utah phosphate rock (calcined to reduce organic matter) is as follows:

| | Percent |
|---|---|
| $P_2O_5$ | 53.50. |
| $SO_3$ | 2.55. |
| $Fe_2O_3$ | 1.00 |
| $Al_2O_3$ | 0.99. |
| F | 0.77. |
| $TiO_2$ | 0.58. |
| CaO | 0.25. |
| V | 0.24. |
| $SiO_2$ | 0.14. |
| Mg, As, Na, K, Cr, Cu, Mn, Pb, Zn, Ni, Ba, Sr, B and Mo | Trace amounts. |
| $H_2O$ | Balance. |

Wet process phosphoric acid, with or without aging, is useful in producing certain solid fertilizers, especially ammonium phosphate and triple superphosphate, since the presence of impurities, soluble or colloidally suspended, does not significantly affect the formulation of these fertilizers. However, an extremely troublesome problem is encountered if the wet process acid is stored or shipped before it is put to this or any of its other applications. A portion of the impurities in the wet process acid, freshly prepared or aged, tends to settle out during storage and shipping, even at about 70° F. The amount of sediment may vary from as little as 1% or 2% to amounts as high as 10%. While a loss of 1% might appear to be a small material loss, the fact is that the sediment takes the form of a sludge which contains considerable available $P_2O_5$. The sludge lines storage vats or railway tank cars in which the acid is transported and is difficult to disperse or to remove without heat and agitation. In some instances, the agglomerated deposit clogs drain lines and pumps. As a result, unloading of the supernatant acid is extremely difficult.

Metallic salt impurities in wet process phosphoric acid also restrict considerably the utility of this grade acid as a substitute for the considerably more expensive but purer electric furnace grade acid as a liquid fertilizer per se or in the formulation of mixed liquid fertilizer solutions. Liquid fertilizer solutions are concentrates containing one or more of the primary active plant food materials, that is, available nitrogen (N), available phosphorus ($P_2O_5$), and available potash ($K_2O$).

It has been considered necessary in the past to apply liquid fertilizers as clear solutions—free from sedimented impurities or sedimented plant food material which would clog spraying equipment. Sedimentation of active plant food material, which occurs either as a result of formulating compositions with plant food nutrient sources in excess of their solubility or by cooling a normally clear fertilizer solution, is highly undesirable for the additional reason that concentration of active plant food nutrient will be nonuniform, with the bottom of the container being richer in plant food values. Accordingly, in formulating fertilizer concentrates capable of being stored and shipped without sedimentation of ingredients, it was formerly necessary to use pure ingredients—free from insoluble impurities—and to counterbalance the desire for producing maximum concentration of primary plant food material to avoid expense of shipping and handling water against the requirement to provide solutions which have a crystallization temperature sufficiently low that "salting out" of fertilizer constituents would not take place when the solutions were subjected to cooling during storage and shipping.

With these limitations in view, mixed liquid plant food concentrates almost invariably have been prepared by one of two general methods—each leading to the production of a simple clear solution which is frequently diluted by the user.

In the first, correct proportions of plant food materials such as urea, ammonium phosphate, phosphoric acid, ammonium nitrate, potassium chloride, etc., are dissolved in water to give a product of the desired analysis; agitation is usually employed to aid in the dissolution of the solids. The system may be heated or cooled when necessary.

The second method, which is meeting more widespread use today, is based on the use of liquid or anhydrous ammonia as the primary nitrogen source. Ammonia based liquid fertilizers have met widespread acceptance by the trade because of lower material cost; low losses due to leaching because of the ready absorption of nitrogen by the soil; and because both nitrate and ammonia nitrogen are made available to plants by the transformation of a portion of the ammonia to a nitrate salt by the soil. In producing this type of primary plant food concentrate, phosphorus is usually derived from the relatively pure electric furnace grade phosphoric acid. Sufficient quantity of ammonia is added to neutralize the phosphoric acid. The system is maintained slightly acid; for example, at a pH of about 6.5. Supplemental nitrogen may be supplied by the addition of water-soluble ammonium salts or urea; muriate of potash may be added when required.

Obviously, the raw material cost of mixed liquid concentrates made up by ammoniating phosphoric acid would be reduced significantly if the less expensive, wet process acid could be used as a substitute for the purer but expensive electric furnace grade acid in formulating liquid fertilizer concentrates which must be stored and shipped.

However, metallic salts normally present as soluble and/or suspended or colloidally dispersed impurities in wet process phosphoric acid form precipitates, consisting for the most part of basic metal phosphates, when the concentrated acid is neutralized with ammonia and cooled to room temperature. The point at which the individual metallic salts are precipitated as phosphates depends on pH. Thus, Fe, Al, Ca and Mg ion contained in the acid begin to precipitate as basic phosphates at the following pH values: Fe, 2.2; Al, 2.7; Ca, 5.3; and Mg, 7.5. The precipitate normally takes the form of a gelatinous agglomerate and is therefore extremely difficult to filter from the mother liquid, unless the ammoniation is carefully controlled, as described in U.S. 2,792,286 to Wordie et al.

As a result of the ammoniation of wet process acid and consequent precipitation of metallic impurities, the acid, without preliminary refining before ammoniation or refining of the ammoniated phosphoric acid solution, does not lend itself to commercial production of a versatile liquid mixed fertilizer concentrate which may be stored and shipped for periods of about two weeks at ambient temperature and which may be used with good results in spraying equipment not equipped with heating coils or the like. Thus, for example, 8–24–0 liquid compositions obtained by ammoniating impure wet process acid, or 8–8–8 solutions obtained by dissolving urea and muriate of potash in ammoniated wet process acid, have formerly been sprayed as freshly prepared solution before settling occurs with consequent variation in analysis and potential clogging of spray nozzles. A concentrate obtained by ammoniating impure wet process phosphoric acid, without filtering or settling out of insolubilized impurities, would form a deposit on the bottom of containers during storage and shipping, and would therefore be wholly unsuitable.

Accordingly, it is a principal object of this invention to provide wet process phosphoric acid solutions and ammoniated wet process phosphoric acid solutions which avoid the above-mentioned difficulties and disadvantages.

Another object is to avoid agglomerated nondispersible sediment in concentrated aqueous solutions of wet process phosphoric acid containing incident impurities or concentrated mixed aqueous fertilizer compositions formulated with such acid.

A more specific object is to provide a method for preventing normally incident impurities in concentrated aqueous solutions of wet process phosphoric acid from forming a non-dispersible sediment at the bottom of the acid solution, which method does not entail appreciable dilution of the acid.

Another object is to produce liquid mixed fertilizer concentrates directly from impure wet process phosphoric acid, without filtration, which concentrates remain substantially stable and homogeneous when stored.

A further object is to provide liquid mixed plant food concentrates formulated with impure wet process acid which may contain higher concentrations of primary plant food nutrient material than can be formulated in prior art solutions based on such acid.

Another object is the provision, in wet process phosphoric acid solutions containing incident metallic salt impurities and in mixed liquid fertilizer concentrates containing such acid, of a means for preventing sedimentation of impurities as a poorly dispersible deposit on the bottom of the compositions.

With these and other objects in view, we have discovered a novel means for obviating difficulties encountered by sedimentation of metallic compounds normally present as impurities in wet process phosphoric acid and in ammoniated impure acid, as well as liquid concentrates of these materials containing additional plant food material.

Stated briefly, in accordance with the subject invention a small quantity of suitable colloidal clay, preferably attapulgite clay, is colloidally dispersed in an aqueous system comprising a solution of a material selected from the group consisting of impure wet process phosphoric acid and ammoniated impure wet process phosphoric acid whereby potentially insoluble impurities normally incident to the production of the acid which may settle out in the aqueous system take the form of finely divided particles which are maintained in stable homogeneous suspension in the system and are not free to gravitate and agglomerate with the adverse effects described above.

The dispersion of suitable colloidal clay in such systems results in a distinct thickening thereof. Thus, any discrete insoluble particles which eventually do form in the aqueous systems as a result of the presence of acid impurities are suspended as they are formed and are maintained in the system in stable homogeneous suspension together with any insolubles normally suspended in the acid.

Further, in the case of ammoniated wet process acid, the colloidally dispersed clay seems to provide a seed or nucleus for the formation of a multiplicity of discrete small crystalline particles rather than a lightweight, copious floc which would normally form and interfere with the spraying properties of the formulation.

Any finely divided particles which may settle out when our liquids are stored for prolonged periods, such as two weeks or more, are readily redispersed with mild agitation in contrast with the usual agglomerated deposits which are extremely difficult to disperse. This benefit may be utilized to make available the full $P_2O_5$ content of the original acid in the aqueous system and to assure homogeneity of the formulation as well as to obviate difficulties in shipping carloads of the acid or mixed fertilizers containing the acid. Further, our concentrated liquids containing impure wet process acid as the sole primary nutrient or mixed fertilizers formulated with such acid may be sprayed even at ambient temperature or temperature somewhat above the freezing point of the aqueous system without danger of clogging spray nozzles, since all insolubles contained therein are very finely divided and are uniformly disseminated throughout the thickened aqueous system.

One important advantage inherent in our fertilizer compositions is that they may contain a higher concentration of primary plant nutrient ingredients in solution than would normally be possible without using more expensive ingredients to lower the crystallization point of the solution. This is because any normally soluble plant food ingredient which will settle out upon cooling of our solutions during storage or shipping will form finely divided suspended crystallites as a result of the presence of the dispersed clay particles therein. These crystallites, which are generally minus 100 mesh, readily pass through conventional spray nozzles.

A further advantage inherent in our liquid fertilizer compositions is that they may, if desired, contain active plant food material-primary and secondary as well as trace elements-in excess of their solubility at room temperature. Any plant food material present in excess of its solubility will be maintained in stable suspension in the sprayable, clay-thickened system. For example, we may formulate and store a balanced fertilizer more concentrated than the 8-8-8 or 9-9-9 formulation which represents about the maximum concentration of a balanced formulation even using relatively pure ingredients. Similarly, in a 1-3-0 ratio formulation, we may produce stable homogeneous compositions containing a higher ratio than 8-24-0, formerly considered the upper limitation using pure plant food sources. Thus, the upper limit to nutrient content of our liquid plant food concentrates is dictated in most instances only by the usual necessity for providing a flowable concentrate.

A further important advantage of our compositions is that our clay does not lose its effectiveness as a suspending agent at extremely low temperature. Thus, our novel compositions can be subjected to temperatures somewhat below their solidification point and then thawed without deleterious effect. Any sediment will readily resuspend upon mildly agitating the system.

More specifically, the clay we prefer to use in carrying out this invention is a colloidal grade of clay containing a predominant amount of the clay mineral, attapulgite, a unique magnesium aluminosilicate. By "colloidal" clay, we refer to a clay which is capable of being dispersed in water to its ultimate colloidally dimensioned particles. This property is possessed by raw attapulgite clay as mined which has a volatile matter content (V.M.) of about 84%. The colloidal properties are substantially maintained until the clay is dried to a V.M. of about 10%, although optimum colloidal properties are possessed by attapulgite clay which has never been dried to a V.M. below about 18%. Thus, we employ attapulgite clay which has never been dried to a V.M. less than about 10%, and preferably one which has never been dried to a V.M. below about 18%. Sepiolite clay, which is very similar to attapulgite clay, should be equally as effective as attapulgite clay when it is available. Raw clay may be used although clay which has been refined to eliminate grit and coarse agglomerates may be preferred. The term "volatile matter" as used herein refers to the weight percent of a material lost when it is heated to substantially constant weight at 1800° F. The volatile matter of our clay is predominantly water.

Unlike most clays, such as bentonite clay and kaolin clay, which are composed of layered minerals, attapulgite and sepiolite clays are composed of ultimate colloidally dimensioned needle-like particles. Colloidal grades of attapulgite clay gel or thicken aqueous systems when dispersed therein because of the unique orientation of the colloidal attapulgite needles in the vehicle. In contrast, those bentonite clays which are capable of thickening water do so by a distinct hydration which in effect pries apart the layers of the clay mineral, causing the mineral to swell. Bentonite clays, e.g., Wyoming bentonite and hectorite, are not as useful in carrying out our invention as is attapulgite clay. Bentonite clay will not disperse and thicken phosphoric acid or ammoniated phosphoric acid unless the clay has previously been hydrated, as by soaking in water using about 5 to 20 parts of clay to 95 to 80 parts by weight of water. In practice prehydrated bentonite clay dispersions which contain in excess of about 10% by weight of clay are too viscous to handle in most equipment and pourable formulations of prehydrated bentonite containing about 5% to 10% of clay are more satisfactory. Therefore, the use of bentonite clay as a thickening agent in our compositions inherently necessitates a dilution which is in many instances highly undesirable. Further, wet process phosphoric acid solutions and ammoniated wet process acid solutions thickened with prehydrated bentonite clay are generally poor in stability as compared with formulations containing attapulgite clay.

The quantity of clay we employ in putting this invention into practice is sufficient to thicken the aqueous system and will vary within the range of about ¼% to 5% of the total weight of the composition, expressed on a volatile free clay basis (determined by heating the clay to substantially constant weight at 1800° F.).

When the clay is used in amount less than about ¼%, the efficiency of the clay in thickening the system and suspending solids therein is decreased somewhat. Systems containing more than about 5% clay may be too thick to pour. The optimum quantity of clay to be used will depend on many variables including the efficiency of clay dispersion and the nature of ingredients present. Generally speaking, the quantities of clay required to obtain systems of given viscosity value will vary inversely with the amount of finely divided solids to be suspended in the systems.

In accordance with one form of our invention, clay is colloidally dispersed in impure wet process phosphoric acid having a $P_2O_5$ analysis as low as 30% and as high as about 54%, preferably before impurities settle out therefrom. The quantity of incident impurities in the acid will vary with the extent to which the acid has been refined, as by aging and/or filtration. Clay, especially attapulgite clay, should be equally effective in providing thickened wet process acid containing about 60% or somewhat more $P_2O_5$ when such acid solutions become available commercially in view of the fact that this clay is dispersible in 62% $P_2O_5$ (reagent grade) acid. The dispersion of the clay in acid may be carried out at room temperature or at elevated temperature below that at which the acid has appreciable vapor pressure. Attapulgite clay may be dispersed in the acid as a powder. Alternatively, this clay may be initially made up as a pregelled concentrate in phosphoric acid by shearing colloidal attapulgite clay in phosphoric acid, using, for example, 10% by weight of the clay; the concentrate is then mixed with the acid to be thickened. These two procedures have the important advantage of introducing substantially no dilution water into the system. Attapulgite clay and bentonite clay may also be added to the acid in the form of pregelled water concentrates containing, for example, 5% to 15% by weight of clay. The thickened wet process acid per se may be used as a fertilizer, with or without dilution by the user, or it may be used as an ingredient in formulating mixed fertilizer goods.

In formulating mixed fertilizer solutions with clay thickened wet process acid containing incident impurities, other primary plant food material may be incorporated with agitation into the previously clay thickened acid, heating or cooling the system when indicated. For example, ammonia gas may be bubbled directly into the thickened acid to produce, for example, a 1 to 3 ratio $N$—$P_2O_5$ composition. Alternatively, ammonium hydroxide solution may be added to clay thickened acid. Supplementary available nitrogen and potassium salts may be incorporated into these systems to produce liquid fertilizers having ratios of 1-1-1, 1-2-2, 6-12-12, etc. Also, substantially nitrogen free liquid fertilizer, e.g., a fertilizer having a ratio of 0-1-1 may be formulated by incorporating caustic potash and other soluble sources of $K_2O$ in the acid without addition of ammonia, urea or the like.

Still in accordance with the invention, mixed fertilizers containing impure wet process acid are formulated by dispersing the clay, either as a powder or a prethickened aqueous concentrate, at any point of the processing. The order of addition of ingredients may be varied widely, taking care to disperse the attapulgite clay in the liquid ingredients before incident impurities precipitate from the ammoniated acid.

For example, an ammonia solution may be pregelled with our clay and added to crude phosphoric acid; additional sources of N and $K_2O$ may be added. Alternatively, the clay may be added after neutralization of acid with ammonia and before addition of other ingredients when used. It is also possible to disperse the clay in a completed formulation while warm and before incipient sedimentation takes place.

Attapulgite clay is colloidally dispersed in a liquid system (e.g., water, crude phosphoric acid solution or mixed fertilizer solution) by applying shear to the system. Various high shear agitating equipment, such as, for example, a homogenizer, high speed stirrer, colloid mill or a pump, may be used, as is known to those skilled in the art.

Our fertilizer compositions may contain as optional ingredients: secondary plant foods, trace elements, herbicides, and the like. These ingredients may be dissolved or suspended in our clay thickened liquids.

A small amount of a dispersant, such as tetrasodium pyrophosphate, may be added to water before dispersion of clay therein to facilitate the dispersion of the clay. A flocculating agent such as lime may be used in amount up to about 2% by weight to stabilize compositions containing free ammonia.

The following examples are given to illustrate more fully the practice of this invention. In these examples, parts represent parts by weight and the clay content is expressed on as "as is" clay basis, e.g., inclusive of the water content of the clay, unless otherwise indicated.

EXAMPLE I

Samples of commercial wet process phosphoric acid, 75% $H_3PO_4$ (54.3% $P_2O_5$), were thickened with 2% by weight of Attagel 30, a refined colloidal grade of attapulgite clay from a deposit near Attapulgus, Georgia. The V.M. of the clay, as produced, is 25%. Other samples of this acid were treated with 2% Wyoming bentonite. This was accomplished by the following methods, all carried out at room temperature:

(a) The Attagel was slowly sifted in wet process acid while the acid was being mixed at low speed in a Waring Blendor. After the addition of Attagel was completed, the acid and clay were mixed at high speed for about five minutes in the Waring Blendor.

(b) A 10% pregel of Attagel 30 in acid was made by sifting the Attagel into a portion of the 54.3% $P_2O_5$ wet process acid which was being mixed in a Waring Blendor at low speed. After addition of Attagel was completed, the system was mixed at high speed until the material channeled. Mixing time was somewhat less than two minutes. The pregel was then added to another portion of 54.3% $P_2O_5$ wet process acid without further dilution and mixed at low speed for two minutes in amount such that the Attagel content of the composition was 2% by weight, "as is" clay basis.

(c) A 15% pregel of Attagel 30 in water was made by sifting the Attagel into water which was being mixed in a Waring Blendor at low speed. After addition of Attagel was completed, the system was mixed at high speed until the material channeled. Mixing time was somewhat less than two minutes. The pregel was then added to concentrated acid without further dilution and mixed at low speed for two minutes in amount such that the Attagel content of the composition was 2% by weight, "as is" clay basis.

(d) As in (a) above using Wyoming bentonite.
(e) As in (b) above using Wyoming bentonite.
(f) As in (c) above using Wyoming bentonite.

The finished samples and a control containing no clay were examined for the following properties:

A. *Suspendability of insoluble salts.*—Samples were placed in sealed one-quart jars at room temperature and observed after 14 days' storage. Suspendability was rated after two weeks' storage at about 75° F. as follows:

Excellent—less than 0.5 inch clear liquid supernatant out of total composition height of 10 inches, and no sediment.

Good—0.5 to 1.0 inch clear liquid supernatant out of 10 inches total, and no sediment.

Fair—1 to 2 inches clear liquid supernatant out of 10 inches total, and no sediment.

Poor—more than 2 inches supernatant out of 10 inches total, and possibly some sediment.

B. *Pourability.*—Samples were rated on ease with which they were able to pour out of a one-quart jar after two weeks' storage without leaving excessive deposits on the walls of the jar.

C. *Redispersibility.*—Samples were rated as to the ease with which any sedimented material could be redispersed by spatula stirring.

The results of this study are reported in Table I.

*Table I*

STABILIZATION OF CONCENTRATED WET PROCESS PHOSPHORIC ACID WITH ATTAGEL 30 AND WYOMING BENTONITE

| Clay | Content percent (As is clay basis) | Method of incorporating clay | Suspendability | Pourability | Redispersibility |
|---|---|---|---|---|---|
| None (control) | | | Poor | Poor | Poor. |
| Attagel 30 | 2 | Dispersed at 2% in conc. acid | Good | Good | Good. |
| Attagel 30 | 2 | Pregelled at 10% in conc. acid | do | do | Do. |
| Attagel 30 | 2 | Pregelled at 15% in water | do | do | Do. |
| Wyoming Bentonite | 2 | Dispersed at 2% in conc. acid* | Poor | Poor | Poor. |
| Wyoming Bentonite | 2 | Pregelled at 10% in conc. acid* | do | do | Do. |
| Wyoming Bentonite | 2 | Pregelled at 15% in water | Fair | Fair | Fair. |

*Wyoming bentonite would not disperse in concentrated wet process phosphoric acid.

These data illustrate the satisfactory storage stability of normally unstable concentrated wet process phosphoric acid when attapulgite clay is colloidally dispersed therein. Also illustrated is that the acid could be stabilized with Wyoming bentonite by using clay previously prehydrated in water, although this clay was inferior to attapulgite clay for the purpose and necessitated dilution of the acid because of the introduction of water required to prehydrate the clay.

EXAMPLE II

This example illustrates some of the benefits of dispersing colloidal attapulgite clay in various 1–3–0 ratio liquid fertilizers formulated by neutralizing wet process phosphoric acid with ammonia.

Experiments were conducted to demonstrate the ability of colloidal attapulgite clay to suspend iron and aluminum phosphate impurities that normally precipitate from wet process acid during neutralization in the production of an 8–24–0 mixed liquid fertilizer. Also, experiments were conducted to show the ability of the clay to suspend primary plant food material present in excess of its solubility at room temperature, as well as phosphate neutralization products in a 1–3–0 ratio liquid fertilizer.

(a) A control 8–24–0 liquid fertilizer was made up by diluting an impure commercial wet process phosphoric acid analyzing 54.3% $P_2O_5$ with water and neutralizing the acid by bubbling ammonia gas into the acid solution. The ammonia gas was bubbled into the solution in a stainless steel container cooled in an ice bath. The solution was mildly agitated during addition of ammonia. The ammonia was introduced at a rate of 5 grams per minute until a pH of 6.5 to 6.8 was obtained and at no time was the temperature of the solution allowed to exceed 140° F. The composition was permitted to cool to about 70° F.

(b) An 8–24–0 liquid fertilizer composition of our invention was produced by repeating the procedure of Example II(a). While the freshly prepared 8–24–0 mixture was above 100° F., Attagel 30 was added in amount of 2% of the solution and the whole mixed for two minutes in an Eppenbach mixer (a type of colloid mill) to disperse the Attagel powder. The composition was then cooled to about 70° F.

(c) The procedure of II(b) was repeated, using a smaller amount of dilution water before introducing the ammonia to produce a 12–36–0 liquid fertilizer containing 2% by weight of Attagel 30.

(d) The procedure of II(b) was repeated, using a smaller amount of dilution water than was used in II(c) to produce a 13–39–0 liquid fertilizer.

The finished fertilizer samples and controls containing no clay were evaluated for suspendability, pourability and redispersibility, as in Example I, with the results reported in Table II.

*Table II*

STABILIZATION OF 1–3–0 RATIO LIQUID FERTILIZER (FROM WET PROCESS PHOSPHORIC ACID) WITH ATTAGEL 30

| Mixture | Attagel 30,[1] percent | Suspendability | Pourability | Redispersibility |
|---|---|---|---|---|
| 8–24–0 (control) | 0 | Poor | Good | Good. |
| 8–24–0 | 2 | Good | ---do--- | Do. |
| 12–36–0 (control) | 0 | Poor | Poor | Poor. |
| 12–36–0 | 2 | Good | Good | Good. |
| 13–39–0 | 1 | ---do--- | Poor | Do. |

[1] "As is" clay basis.

The data reported in Table II show that Attagel stabilized phosphatic neutralization products which normally settle out in large quantities when an 8–24–0 liquid fertilizer is made up with impure wet process phosphoric acid.

Further, the data show that stable 1–3–0 ratio liquid fertilizers containing sources of available N and $P_2O_5$ in excess of their solubility could be produced with wet process acid. Thus, a stable, pourable 12–36–0 composition was produced.

EXAMPLE III

1–1–1 ratio complete liquid fertilizer compositions of our invention were formulated with wet process phosphoric acid and evaluated as in the previous example. Compositions containing concentrated primary plant food material approaching the upper limit of solubility of primary plant food values, i.e., an 8–8–8 formulation, were produced with and without colloidal attapulgite for comparison.

Also produced were complete 1–1–1 ratio formulations containing primary plant food material in excess of their solubility.

(a) The procedure followed in producing the control 8–8–8 formulation was as follows:

Commercial wet process phosphoric acid (54.3% $P_2O_5$) was diluted with water and placed in an agitated stainless steel beaker cooled in an ice bath. Gaseous ammonia was bubbled into the cooled solution at a rate of 5 grams per minute until a pH of 6.5 to 6.8 was obtained. The temperature of the solution was controlled to remain at 140° F. Urea (45% N) and white muriate of potash (62% $K_2O$) were dissolved in the hot solution in amount to produce a composition analyzing 8–8–8.

(b) The procedure of Example III(a) was repeated in full and Attagel 30 powder was added to the composition after addition of urea and potash while the liquid composition was warm and substantially clear. The ingredients were mixed for two minutes in an Eppenbach mixer to disperse the clay in the aqueous system and permitted to cool to 70° F.

(c) Two 14–14–14 formulations and a 15–15–15 formulation were made up using the procedure of Example III(b), with appropriate adjustment of quantities of plant food material. As in Example III(b), the Attagel was added to the plant food composition and mixed for two minutes in an Eppenbach mixer to disperse the clay and to ensure the fineness of insoluble plant food salts.

*Table III*

STABILIZATION OF 1–1–1 RATIO LIQUID FERTILIZERS (BASED ON WET PROCESS PHOSPHORIC ACID) WITH ATTAPULGITE CLAY

| Mixture | Attagel 30,[1] percent | Suspendability | Pourability | Redispersibility |
|---|---|---|---|---|
| 8–8–8 | 0 | Poor | Good | Fair. |
| 8–8–8 | 2 | Good | ---do--- | Good. |
| 14–14–14 | 2 | ---do--- | Fair | Do. |
| 15–15–15 | 1 | ---do--- | Poor | Do. |

[1] "As is" clay basis.

The data summarized in Table III show that the complete formulation containing no colloidal attapulgite clay tended to form a large quantity of sediment which was not easily redispersed, whereas in all formulations containing the clay, any sediment redispersed readily upon stirring. This phenomenon is an added advantage if the products are stored over an extended period of time. If any sedimentation should occur, the product can be made uniform through the use of an air sparger system or pump cycling system.

EXAMPLE IV

1–2–2 ratio liquid fertilizer compositions of this invention were produced using the same raw materials used in Example III and repeating the procedure of that example. The results which are generally similar to those obtained in Example III are tabulated in Table IV.

*Table IV*

STABILIZATION OF 1–2–2 RATIO LIQUID FERTILIZERS (BASED ON CRUDE WET PROCESS PHOSPHORIC ACID) WITH ATTAGEL 30

| Mixture | Attagel 30,[1] percent | Suspendability | Pourability | Redispersibility |
|---|---|---|---|---|
| 5–10–10 | 0 | Poor | Good | Fair. |
| 5–10–10 | 2 | Fair | ---do--- | Good. |
| 9–18–18 | 0 | Poor | Poor | Poor. |
| 9–18–18 | 1 | Good | Good | Good. |
| 9–18–18 | 2 | ---do--- | Fair | Do. |
| 10–20–20 | 1 | ---do--- | Good | Do. |

[1] "As is" clay basis.

EXAMPLE V

This example illustrates the production of still another liquid fertilizer composition of our invention. The attapulgite clay used as the suspending agent was "Permagel," a purified colloidal grade of the clay with a volatile matter content in the range of about 33%.

A 10% aqueous dispersion of Permagel was prepared in a high shear mixer by agitating the clay in water containing tetrasodium pyrophosphate dispersant in the amount of 0.25% (based on the volatile free weight of the Permagel). 5.8 parts by weight of anhydrous ammonia (80% N) was bubbled into 25.0 parts of the 10% Permagel concentrate to supply 4.7 parts of nitrogen. 0.2 parts by weight of lime was added to flocculate the ammoniated dispersion. 25.8 parts by weight of wet process grade phosphoric acid (54.4% $P_2O_5$) was mixed in to supply 14 parts of $P_2O_5$. 20.6 parts of urea (46.7% N) was mixed in to supply 9.3 parts of nitrogen and 14 parts of $K_2O$ were supplied by incorporating 22.6 parts of powdered potassium chloride (63.1% $K_2O$).

A moderately heavy, pourable gel resulted which showed excellent stability at a temperature as low as 10° F. When the sample returned to room temperature, no sedimentation of insoluble or crystallized particles was observed, indicating the colloidal clay was suspending the particles.

case, the amount of clay used was 2% of the total composition, "as is" clay basis.

At the end of two weeks the total height of each composition and the height of supernatant appearing in each sample were recorded with the results tabulated in Table V.

The data reported in Table V illustrate that attapulgite clay was highly efficient in maintaining homogeneous an 8–24–0 liquid fertilizer which normally separated during storage in two distinct phases of roughly equal volume. Thus, all systems containing attapulgite clay consisted substantially of an apparently single homogeneous thickened phase after storage for two weeks. Incorporation of prehydrated bentonite resulted in a distinct improvement in stability, although it was not as efficient as attapulgite clay.

*Table V*

STABILIZATION OF AMMONIATED WET PROCESS PHOSPHORIC ACID (8-24-0) WITH ATTAGEL 30 AND WYOMING BENTONITE

| Clay | Content percent (As is clay basis) | Method of Incorporating Clay | Total Height of Composition, cm. | Height of Supernatant Liquid in Aged Composition, cm. |
|---|---|---|---|---|
| None (control) | | | 12.6 | 6.9 |
| Attagel 30 | 2 | Added dry | 13.4 | 0.1 |
| Wyoming Bentonite | 2 | Added dry* | 12.5 | 7.6 |
| Attagel 30 | 2 | Added as 10% pregel in water | 12.4 | 0.6 |
| Wyoming Bentonite | 2 | Added as 10% pregel in water | 14.3 | 1.1 |

*Wyoming bentonite would not disperse directly.

EXAMPLE VI

This example illustrates the production of an 8–24–0 liquid fertilizer composition of our invention by ammoniating crude wet process acid which had previously been gelled with attapulgite clay.

Crude wet process phosphoric acid (54.4% $P_2O_5$), previously gelled with 6% of Attagel by sifting the dry clay into the acid and shearing the mixture, was diluted with water and neutralized (pH 6.5) with anhydrous ammonia to produce stable 8–24–0 liquid fertilizer containing approximately 3% Attagel 30 as a suspending agent.

EXAMPLE VII

Experiments were conducted to compare colloidal attapulgite clay with bentonite clay as a stabilizing agent for a 8–24–0 liquid fertilizer obtained by ammoniating wet process phosphoric acid containing incident impurities.

A control 8–24–0 liquid fertilizer was produced by bubbling ammonia gas into diluted 54.3% wet process acid to a pH of about 6.5. Control samples were placed in sealed pint jars and permitted to age at room temperature for two weeks.

Attapulgite clay and Wyoming bentonite clay were dispersed in samples of the warm freshly produced 8–24–0 system and the compositions placed in sealed pint jars and stored for two weeks at room temperature. Two methods were used in dispersing each of these clays in 8–24–0 solutions.

In accordance with one method, powdered clay was sifted in warm 8–24–0 liquid and the mixture agitated at high speed (in an Eppenbach mixer for 5 minutes). In the second method, a 10% pregel of clay was formed and the pregel agitated into warm freshly ammoniated wet process phosphoric acid (pH 6.5), analyzing 8–24–0 including the water added with the clay pregel. In each

We claim:
1. A plant food concentrate in the form of a flowable thickened liquid and consisting essentially of a concentrated aqueous solution of wet process phosphoric acid containing insoluble impurities normally associated with wet process phosphoric acid, and colloidal attapulgite clay dispersed in said solution in amount that is sufficient to maintain any insoluble impurities in said solution in stable homogeneous suspension therein and is insufficient to cause said solution to become unpourable.

2. A plant food concentrate in the form of a flowable thickened liquid and consisting essentially of an aqueous solution of wet process phosphoric acid of about 30% to about 54% $P_2O_5$ weight concentration and containing impurities normally associated with wet process phosphoric acid, and dispersed in said solution colloidal attapulgite clay in amount within the range of about ¼% to about 5% by weight, expressed on a volatile free clay weight basis.

3. A method of treating an aqueous solution of wet process phosphoric acid of about 30% to about 60% $P_2O_5$ concentration and containing incident metallic salt impurities to prevent said impurities from forming a sediment in said acid when they settle out therefrom, said method comprising: thickening said solution of acid before said impurities settle out by agitating colloidal attapulgite clay in said solution at room temperature at a high shear rate, so as to disperse colloidally said clay in said solution of acid, said clay being employed in amount within the range of about ¼% to 5% of the weight of said solution, expressed on a volatile free clay weight basis.

4. The method of claim 3 wherein said clay is added as a powder to said acid without incorporation of water whereby the concentration of said solution of acid is not reduced significantly.

(References on following page)

References Cited in the file of this patent

UNITED STATES PATENTS

| | | |
|---|---|---|
| 2,233,867 | Howe | Mar. 4, 1941 |
| 2,324,079 | Greger | July 13, 1943 |
| 2,594,257 | Durgin | Apr. 22, 1952 |
| 2,683,658 | Saunders | July 13, 1954 |
| 2,773,757 | Connell et al. | Dec. 11, 1956 |
| 2,784,110 | Tatlock | Mar. 5, 1957 |
| 2,790,776 | Savage et al. | Apr. 30, 1957 |
| 2,792,286 | Wordie et al. | May 14, 1957 |
| 2,800,449 | Browning | July 23, 1957 |
| 2,815,323 | Schneider | Dec. 3, 1957 |
| 2,831,818 | Barrett | Apr. 22, 1958 |
| 2,894,848 | Goodwin et al. | July 14, 1959 |
| 2,918,405 | Barr et al. | Dec. 22, 1959 |
| 2,971,292 | Malecki | Feb. 14, 1961 |

OTHER REFERENCES

Rose et al.: The Condensed Chemical Dictionary, 5th ed., Reinhold Publ. Corp., New York, Chapman and Hall, Ltd., London, 1956, pages 119, 503.

Grim: Clay Mineralogy, McGraw-Hill Book Co., Inc., New York, 1953, page 360.

Chemical and Engineering News, vol. 37, No. 39, Sept. 28, 1959, page 70.

McCarter et al.: "Thermal Activation of Attapulgus Clay," Ind. & Eng. Chem., vol. 42, No. 3, 1950 (pp. 529–33).

UNITED STATES PATENT OFFICE
CERTIFICATE OF CORRECTION

Patent No. 3,160,495                              December 8, 1964

Homer A. Smith et al.

It is hereby certified that error appears in the above numbered patent requiring correction and that the said Letters Patent should read as corrected below.

Column 5, line 27, for "84%" read -- 48% --; columns 11 and 12, Table V, column 5 thereof, under the heading "Height of Supernatant Liquid in Aged Composition, cm.", the figures should appear as shown below instead of as in the patent:

6.9
0.1
7.6
0.1
1.6

Signed and sealed this 27th day of April 1965.

(SEAL)
Attest:

ERNEST W. SWIDER                            EDWARD J. BRENNER
Attesting Officer                          Commissioner of Patents